(12) United States Patent
Wilson

(10) Patent No.: US 6,460,286 B1
(45) Date of Patent: Oct. 8, 2002

(54) ARTICULATING FISHING LURE

(75) Inventor: Scott Wilson, Deland, FL (US)

(73) Assignee: NGC Worldwide Inc., Fairfield, CT (US)

( * ) Notice: Subject to any disclaimer, the term of this patent is extended or adjusted under 35 U.S.C. 154(b) by 0 days.

(21) Appl. No.: 09/860,076

(22) Filed: May 17, 2001

(51) Int. Cl.[7] .......................... A01K 85/00; A01K 85/02
(52) U.S. Cl. .................... 43/42.15; 43/42.03; 43/42.41; 43/42.4; 43/42.35
(58) Field of Search ............................ 43/42.03, 42.15, 43/42.11, 42.4, 42.41, 42.42, 42.35, 42.36, 42.45, 42.48; 446/153, 159, 278

(56) References Cited

U.S. PATENT DOCUMENTS

| | | | | |
|---|---|---|---|---|
| 857,883 A | * | 6/1907 | Kreisser | 43/42.15 |
| 879,869 A | * | 2/1908 | Hansen | 43/42.36 |
| 1,109,439 A | * | 9/1914 | Maus | 43/42.15 |
| 1,393,617 A | * | 10/1921 | Frame | 43/42.4 |
| 1,402,798 A | | 1/1922 | Ryan | 43/42.15 |
| 1,477,756 A | * | 12/1923 | Heddon et al. | |
| 1,557,644 A | | 10/1925 | Anderson | 43/35 |
| 1,602,329 A | * | 10/1926 | Bonnett | |
| 1,773,561 A | * | 8/1930 | Wethall | 43/42.48 |
| 1,855,097 A | * | 4/1932 | Chamberlaine | 43/42.45 |
| 2,202,519 A | * | 5/1940 | Ferris | |
| 2,535,392 A | | 12/1950 | Dale | 43/42.13 |
| 2,565,099 A | | 8/1951 | Simmons | 43/42.03 |
| 2,593,461 A | | 4/1952 | Jones | 43/42.03 |
| 2,596,201 A | * | 5/1952 | Bocchino | |
| 2,613,470 A | | 10/1952 | Eslinger | 43/42.03 |
| 2,618,092 A | * | 11/1952 | Hinkle | 43/42.15 |
| 2,621,439 A | * | 12/1952 | Leidel | |
| 2,674,060 A | * | 4/1954 | Simmons | |
| 2,700,239 A | * | 1/1955 | Ellis | 43/42.15 |
| 2,876,580 A | * | 3/1959 | Schwartztrauber | 43/42.15 |
| 2,910,799 A | * | 11/1959 | Wentworth | 43/42.15 |
| 3,284,944 A | * | 11/1966 | Settle | |
| 3,735,518 A | | 5/1973 | Kleine et al. | 43/42.04 |
| 4,098,017 A | * | 7/1978 | Hall | 43/42.35 |
| 4,188,743 A | * | 2/1980 | Nothdurft | 43/42.15 |
| 4,573,282 A | * | 3/1986 | Rowe | |
| 4,873,782 A | * | 10/1989 | Gudermuth, Jr. | 43/42.15 |
| 5,058,310 A | * | 10/1991 | Andersen | |
| 5,522,170 A | | 6/1996 | Cole | 43/42.11 |
| 5,911,571 A | | 6/1999 | Wittbrot, III | 43/42.15 |
| 6,192,618 B1 | | 2/2001 | Wackerman | 43/42.31 |
| 6,385,896 B1 | * | 5/2002 | Thomassin | 43/42.03 |

FOREIGN PATENT DOCUMENTS

| | | | | |
|---|---|---|---|---|
| AT | 264908 B1 | * | 9/1968 | 43/42.15 |
| FR | 727405 B1 | * | 6/1932 | 43/42.15 |
| FR | 2587648 B1 | * | 3/1987 | |
| GB | 618400 B1 | * | 2/1949 | 43/42.15 |
| GB | 619994 B1 | * | 3/1949 | 43/42.15 |
| JP | 2000-217470 B1 | * | 8/2000 | |
| JP | 2001-112380 B1 | * | 4/2001 | |
| NO | 73399 B1 | * | 4/1948 | |
| NO | 71387 B1 | * | 9/1949 | |
| NO | 86740 B1 | * | 5/1956 | |

* cited by examiner

Primary Examiner—Darren W. Ark
(74) Attorney, Agent, or Firm—David P. Gordon; David S. Jacobson; Thomas A. Gallagher

(57) ABSTRACT

A fishing lure includes a plurality of substantially rigid, preferably plastic body sections including a head section, a tail section, and three central body sections, decreasing in size from the head to the tail, therebetween. Each section behind the head section includes a hinge portion, and each section in front of the tail section includes a cavity, and each hinge portion is snap fit into the cavity of an adjacent section to form a hinge assembly having a pivot axis inside the respective cavity. The hinge assemblies are together adapted to permit different degrees of relative movement of selected adjacent sections to more closely simulate the movement of a live bait fish, and particularly produce fluid tail end movement, as the lure is being pulled through water. Various embodiments are provided.

31 Claims, 4 Drawing Sheets

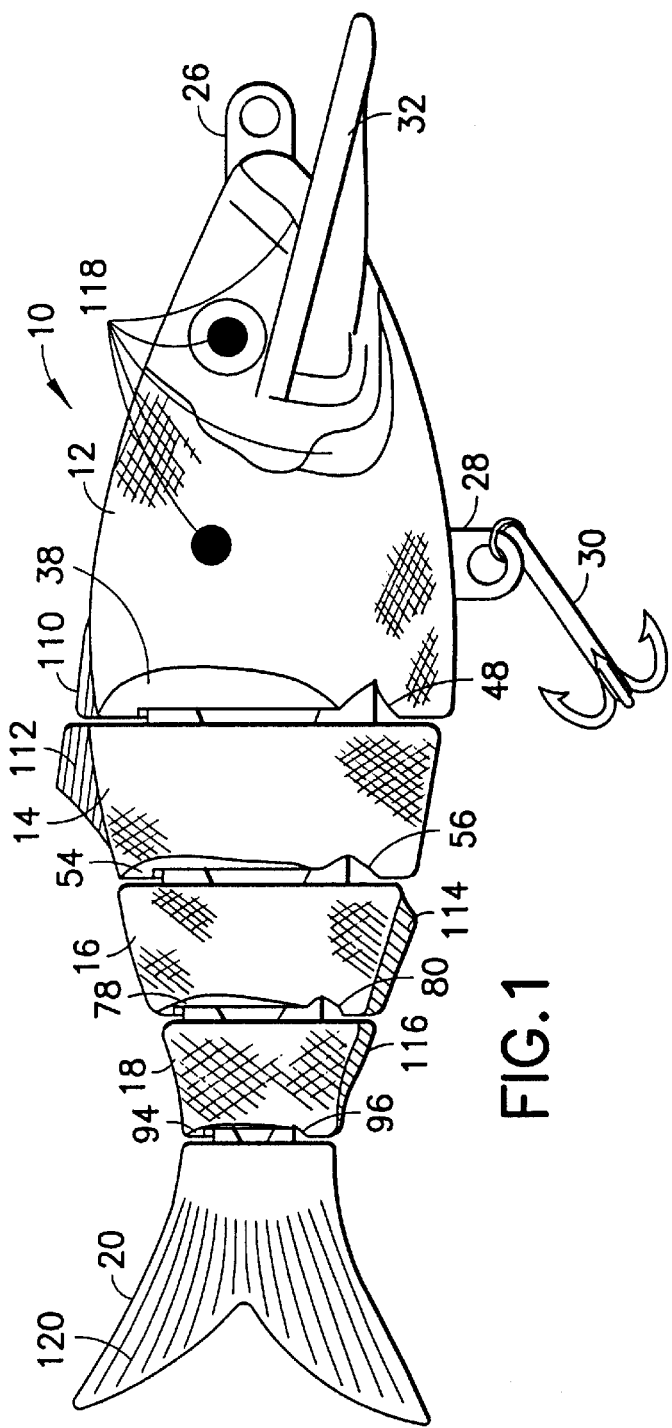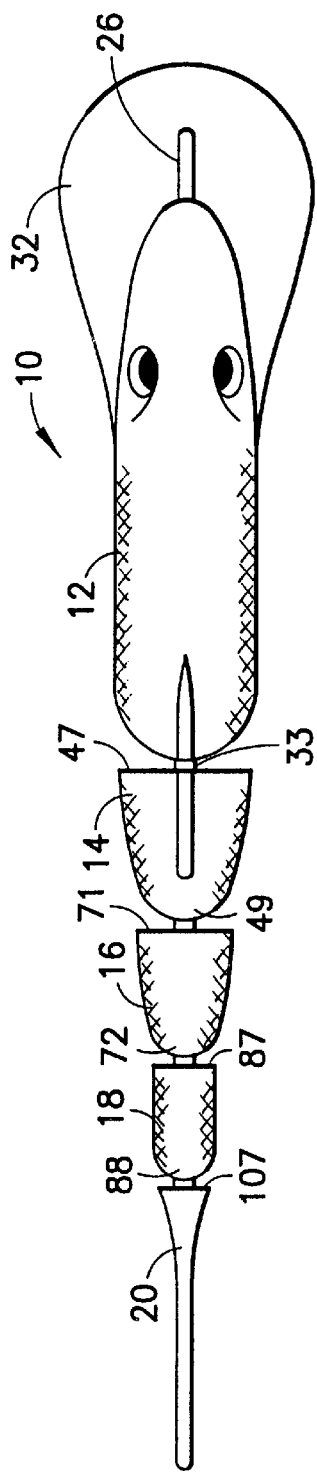
FIG. 1
FIG. 2

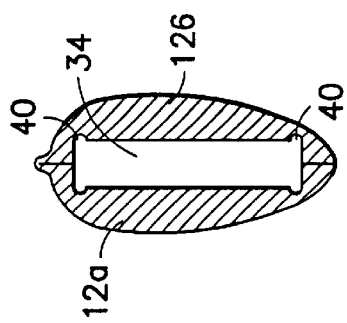
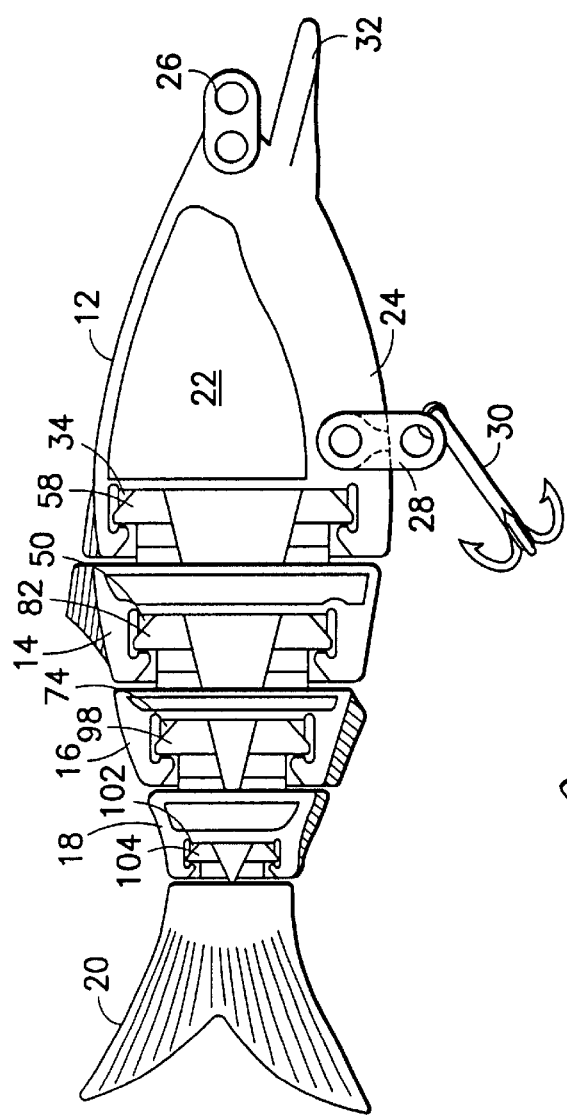
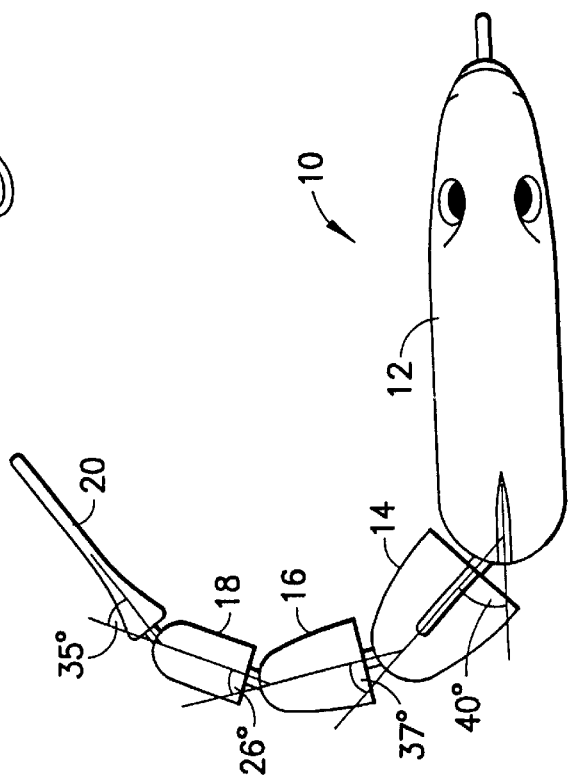

ARTICULATING FISHING LURE

BACKGROUND OF THE INVENTION

1. Field of the Invention

This invention relates broadly to fishing equipment. More particularly, this invention relates to fishing lures which are designed to simulate the movement of live bait.

2. State of the Art

Fishermen have for centuries attempted to design or discover the perfect bait to lure their intended catch to their hook. Fishermen know that fish are instinctively attracted to the movement of live bait. Unfortunately, it is not always possible or convenient for a fisherman to carry or fish with live bait. Further, live bait is more expensive to use, is not always readily available, and is difficult to place on a barbed hook without killing the bait or otherwise greatly reducing its ability or desire to move naturally.

Over the years, fishing equipment manufacturers have made numerous attempts to perfect an artificial fishing lure which simulates characteristics of a variety of types of live bait fish. The lures are generally carved from wood or molded from plastic to closely simulate the look of the particular bait fish. While manufacturers of such lures have succeeded in designing artificial bait with a generally lifelike in appearance, they have not been completely successful at designing a lure which simulates the movements of live bait in actual use. One proposed mechanism to simulate a live bait with a hard motion lure is to provide the lure with several discrete body elements which can articulate relative to each other. U.S. Pat. No. 1,402,798 to Ryan, U.S. Pat. No. 1,557,644 to Andersen, U.S. Pat. No. 2,535,392 to Dale, and U.S. Pat. No. 5,522,170 to Cole each disclose lures having articulating body elements. Nevertheless, even such lures fail to move in a realistic manner when pulled through the water. Furthermore, none of the known lures are adapted to simulate an injured bait fish which can be attractive to a game fish, such as bass.

SUMMARY OF THE INVENTION

It is therefore an object of the invention to provide a fishing lure which simulates the appearance of a bait fish.

It is another object of the invention to provide a fishing lure which simulates the movement of a bait fish when pulled through water.

It is a further object of the invention to provide a fishing lure which simulates an injured bait fish when in the water but not pulled.

It is also an object of the invention to provide a fishing lure which can be fished in vegetation.

In accord with these objects, which will be discussed in detail below, an articulating fishing lure is provided which includes a plurality of substantially rigid, preferably plastic body sections including a head section, a tail section, and preferably three central body sections therebetween. The head section includes an upper air cavity which causes the lure to remain upright in water and a rear hinge cavity. Each of the three central body sections includes a rear hinge cavity and a front bifurcated hinge portion, and a vertical air chamber therebetween. The tail section includes a fish tail portion and a front bifurcated hinge portion. Each hinge portion is snap fit into the hinge cavity on the adjacent body section to provide a hinge assembly with a pivot axis of each hinge assembly resides inside a respective hinge cavity. According to a preferred aspect of the invention, the hinge assemblies are adapted to permit different degrees of relative movement of selected adjacent body sections to more closely simulate the movement of a live bait fish, and particularly produce fluid tail end movement, as the lure is being pulled through water.

According to a first embodiment of the invention, the head section includes a lower hook linked to a ring at the bottom of the head section. The first embodiment also optionally includes a front bill molded adjacent a mouth location on the head section of the lure. The bill causes the lure to dive in water when tension is provided to fishing line to which the lure is attached; i.e., when the fishing line is pulled or reeled in. The lure may also be provided without the bill to function as a surface lure.

According to a second embodiment of the invention, the head section is provided with a single hook fixedly attached to a lower portion of only one side of the head section. The location of the hook offsets the center of gravity when the lure is not being pulled through the water, and causes the lure to tilt to one side. This positional tilt simulates a dying shad and has been found very attractive to game fish such as bass. When the lure is then pulled, the lure straightens and has a natural live bait motion. A weed guard is provided adjacent the hook and permits the lure to be fished in vegetation.

Additional objects and advantages of the invention will become apparent to those skilled in the art upon reference to the detailed description taken in conjunction with the provided figures.

BRIEF DESCRIPTION OF THE DRAWINGS

FIG. 1 is a side elevation view of an articulating fishing lure according to a first embodiment of the invention;

FIG. 2 is a top view of the articulating fishing lure of FIG. 1;

FIG. 3 is a longitudinal section view of the first embodiment of the articulating fishing lure;

FIG. 5 is a cross section across line 5—5 in FIG. 4;

FIG. 6 is a top view of the fishing lure illustrating the preferred maximum degree of articulation of adjacent body parts in each embodiment of the fishing lure;

DETAILED DESCRIPTION OF THE PREFERRED EMBODIMENTS

Figure 4:
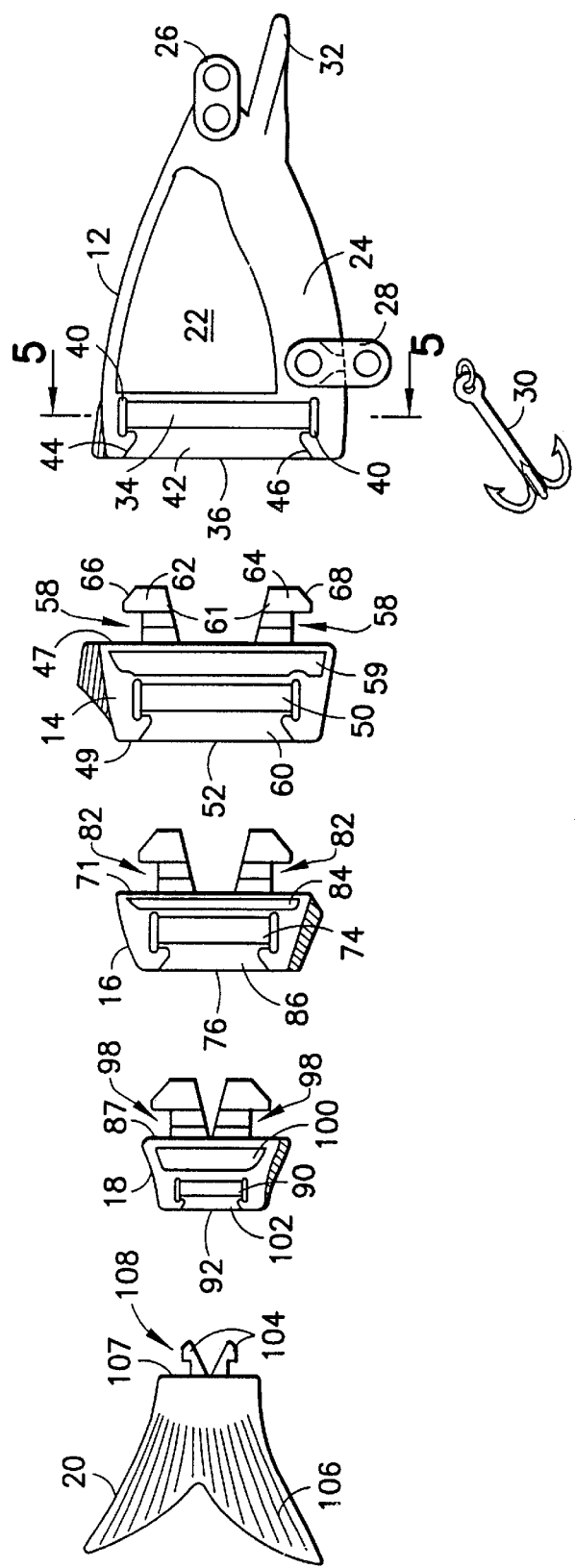
FIG. 4 is an exploded longitudinal section view of the first embodiment of the articulating fishing lure.

Turning now to FIGS. 1 and 2, a first embodiment of a fishing lure 10 according to the invention is shown. The lure 10 includes a plurality of substantially rigid, preferably plastic body sections including a head section 12, first, second and third body sections 14, 16, 18, respectively decreasing in relative size, and a tail section 20. The head section 12 has a length and a volume which are each greater than the combined length and combined volume of the central body sections, and preferably substantially equal to or greater than the combined volume of the central body sections, and preferably additionally the tail section. As described in detail below, the sections are articulably coupled together.

Referring to FIGS. 1 through 4, the head section 12 includes an upper air chamber 22, and a solid ballast portion 24 therebeneath which together operate to cause the head section, and thereby the lure, to remain upright in water. The head section 12 also includes a forward link 26 at which fishing line (not shown) can be attached to pull the lure through water, and a bottom link 28 to which a triple hook 30 is attached. The links 26 and 28 are preferably made of metal and integrated with the head section during the assembly process. Alternatively, the links 26 and 28 may be molded unitarily and integrally of plastic with the head section during the molding process. The head section 12 optionally includes a diving bill (or diving lip) 32 which urges the lure to dive in water when the fishing line attached to the lure is pulled through the water or reeled in.

According to a preferred aspect of the invention, the head section 12 includes a rear vertical hinge cavity 34, an entrance 36 into the hinge cavity, and a rounded rear surface 33 defining a beveled outer surface 38 at each side of the entrance 36 to the hinge cavity. The top and bottom of the cavity 34 are preferably provided with orthogonal recesses 40 (FIGS. 4 and 5), the purpose of which is described below. The entrance 36 includes laterally angled surfaces 42 (preferably outwardly angled at approximately 40° relative to the longitudinal axis of the lure) extending away from the hinge cavity 34, and upwardly and downwardly angled surfaces 44, 46 respectively. Preferably, triangular notches 48 are provided at a lower portion of the lateral sides of the entrance to the hinge cavity adjacent the downwardly angled surface 46.

The first body section 14 includes a relatively flat front 47, a rear hinge cavity 50, a rounded rear portion 49 having an entrance 52 into the cavity and defining a beveled outer surface 54, and lateral notches 56, each substantially similar to the like element in the head section 12 but relatively smaller in size. The first body section also includes a front hinge portion 58 and a vertical air chamber 59 between the hinge portion and the cavity 50. The lateral walls 60 of the entrance are preferably outwardly angled approximately 37° relative to the cavity. The hinge portion 58 includes a bifurcated spindle 61 with portions 62, 64 each having a beveled edge 66, 68 adapted to contact the upwardly and downwardly angled surfaces 44, 46 on the head section 12. The spindle 61 is effectively longer than the largest dimension at the entrance 36 of the head section. The first body section 14 is articulably coupled to the head section 12 by pushing the front hinge portion 58 into the entrance 36 of the head section such that the beveled edges 66, 68 of the spindle 61 contacts the angled surfaces 44, 46, compresses in effective length, and is forced in the hinge cavity 34 where it resiliently expands such that it is trapped but pivotable therein. That is, the front hinge portion 58 snap fits into the rear hinge cavity 34 to form a hinge assembly which permits the first body section 14 to laterally pivot, or articulate, relative to the head section 14.

The second section 16 is substantially similar to the first section 14, but with elements relatively smaller in size. For example, the second section 16 includes a relatively flat front 71, a rear hinge cavity 74, a rounded rear portion 72 having a cavity entrance 76 and defining a beveled outer surface 78, lateral notches 80, a front hinge portion 82, and a vertical air chamber 84. The lateral walls 86 of the entrance 76 are preferably outwardly angled approximately 26° relative to the cavity 74. The second section 16 is snap fit into the hinge cavity 50 of the first section 14.

The third section 18 is substantially similar to the first and second sections 14 and 16, but with elements relatively smaller in size. For example, the third section 18 includes a relatively flat front 87, a rear hinge cavity 90, a rounded rear portion 88 having a cavity entrance 92 and defining a beveled outer surface 94, lateral notches 96, a front hinge portion 98, and a vertical air chamber 100. The lateral walls 102 of the entrance 92 are preferably outwardly angled approximately 35° relative to the cavity 90. The third section 18 is snap fit into the hinge cavity 74 of the second section 16.

The tail section 20 includes a preferably bifurcated fish tail portion 106, a relatively flat front 107, and a front hinge portion 108 extending therefrom. The front hinge portion 108 is snap fit into the hinge cavity 90 of the third section 18.

Referring to FIGS. 1 through 6, all hinge pivot locations are hidden inside the respective body sections (i.e., covered on each side, top and bottom) and accessed only through the entrances. As such, the hinge pivot locations are in front of the gaps between the segments. This allows the body sections to be closer together which gives a continuous appearance to the lure whether viewed from the sides, top, or bottom. In addition, this assembly also permits each section to swing out relatively widely with more body surface located to the side of the lure. More body surface swinging out to the side provides greater water resistance as the lure is being pulled through the water and causes a 'kick' which pushes the sections back to the opposite side. The result is a wider and more frantic swimming action. In addition, as the segmentation of the lure occurs primarily in the latter half of the lure (with the rigid head section assuming substantially half the length and volume of the lure), the movement occurs in the latter half of the lure, with the front of the body remaining stiff in a manner which simulates the movement of a live bait fish.

Preferred exemplar dimensions for the sections of the lure are as follows: The head section 12 has a length of approximately 4.4 mm and a height of approximately 3 mm, the first body section 14 has a length of approximately 1.2 mm and a height of approximately 2.9 mm, the second body 16 section has a length of approximately 1.1 mm and a height of approximately 2.4 mm, the third body section 18 has a length of approximately 1.1 mm and a height of approximately 1.8 mm, and the tail section 20 has a length of approximately 1.2 mm to the bifurcation in the tail and a length of approximately 2.3 mm at the tip of the tail and a height of approximately 3.4 mm across the tip of the tail.

Referring particularly to FIG. 6, according to a preferred aspect of the invention, in view of the various angles of the lateral walls of the cavity entrances on the body and head sections, each section of lure is permitted a limited degree of movement relative to the adjacent body section to more closely simulate the movement of a live bait fish, and particularly produce fluid tail end movement, as the lure is being pulled through water. The first body section 14 is permitted a maximum movement of preferably approximately 40° relative to the head section 12, the second body section 16 is permitted a maximum movement of preferably approximately 37° relative to the first body section 14, the third body section 18 is permitted a maximum movement of preferably approximately 26° relative to the second body section 16, and the tail section 20 is permitted a maximum movement of preferably approximately 35° relative to the third body section 18. It has been determined that restricting the movement of the third body section 18 relative to the second section 16 more than movement is restricted between the second body section 16 and the first body section 14, and more than movement is restricted between the tail section 20 and the third body section 18 provides superior results in the simulation of life-like fluid motion of a bait fish lure. In addition, the rounded rear portions 33, 49, 72 and 88, as well as the beveled outer surfaces 36, 54, 78 and 94 and notches 48, 56, 80 and 96 cooperate to permit the desired degree of movement by minimizing interface between adjacent sections. Particularly, the notches 48, 56, 80 and 96 permit movement that would otherwise be estopped by interference between the lateral walls of the cavity entrances and the hinge portions. When the lure swims, the swimming action causes the hinges to move the maximum permitted amount. It should be noted that while all above described angles of permitted movement are preferred, they are also exemplary, and that the sections can be adapted for other maximum relative angular movement.

As discussed above, when the lure is pulled through water it has a frantic or exaggerated swimming action, with the latter half of the lure moving from side to side in a swimming action. The reason that the lure swims in this manner is not entirely understood, and from what is taught in the prior art, the lure of the invention should not swim: it has no flaps and is very streamlined, two aspects which defy convention for swimming lures. In addition, other lures provided with a diving bill cause the head of the lure to wiggle when diving. The lure invention, when provided with a diving bill, maintains a still head when diving and has a wiggling or swimming body. It is noted that the swimming occurs whether or not the lure is provided with a diving bill. Two reasons for the strong and realistic swimming action are hypothesized. First, the preferred length of each section of the lure, found through trial and error, may correspond to a wave shape created in the water for the size and shape of the lure, and the lure then moves within the wave created in the water. Second, when the lure is pulled through the water, there may exist turbulent flow about the lure which causes movement about the hinges such that the lure swims. Other reasons may properly explain the swimming movement.

FIG. 6 also shows a modification to the first embodiment in which the fishing lure does not include the diving bill (element 32 in FIGS. 1 and 2). Without the diving bill, the lure is adapted for surface fishing.

Referring back to FIG. 1, preferably the head and first body section 14 are provided with upper fin portions 110, 112 and the second and third body sections 16, 18 are provided with lower fin portions 114, 116. The head section 12 is also preferably provided with indicia 118, either molded and/or printed thereon, to indicate features of a bait fish such as eyes, mouth, gills, scales, natural markings, etc., and preferably particularly features indicating a shad. Furthermore, the tail section 20 includes indicia of a fish tail, e.g., fanned striations 120.

Referring back to FIG. 5, each section of the lure 10 is preferably molded in two halves, e.g., 12a and 12b with respect to the head section 12. During assembly, the halves of each section of the lure are touched onto a glue pad. The hinge cavities often collect an amount of glue, and when dried the glue has a thickness which could otherwise cause the spindle portions of the hinges to bind and prevent fluid articulation. However, according to the invention, the recesses 40 (FIGS. 4 and 5) provided in each hinge cavity operate to pull any pooling glue away from the locations which receive the spindle portions of the hinge to provide a smoothly operating hinge assembly.

Figure 9:
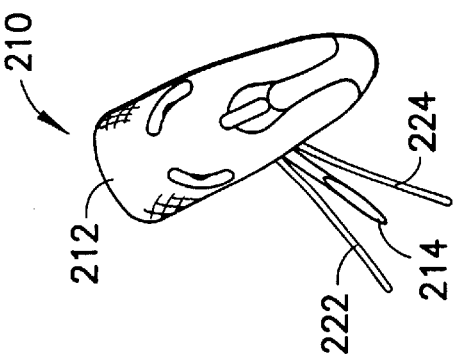
FIG. 9 is a head end view of the second embodiment of the articulating fishing lure, shown motionless in water and simulating a dying shad.
Figure 7:
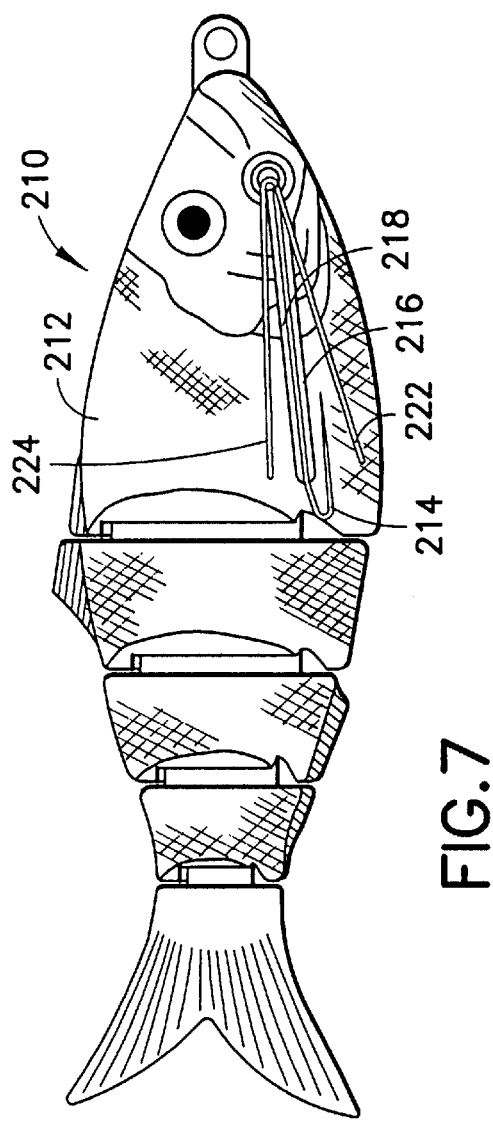
FIG. 7 is a side elevation view of an articulating fishing lure according to a second embodiment of the invention.
Figure 8:
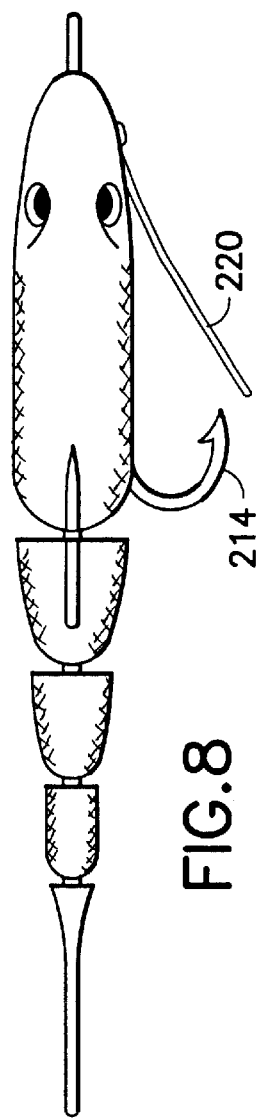
FIG. 8 is a top view of the articulating fishing lure of FIG. 7.

Turning now to FIGS. 7 and 8, a second embodiment of a lure 210, substantially similar to the first embodiment, is shown. In accord with the second embodiment, the head section 212 is provided with a single hook 214 fixedly attached to a lower portion of one side of the head. Preferably, the head portion is molded with a channel 216 adapted to receive the shank 218 of the hook. The location of the hook 214 offsets the center of gravity when the lure 210 is not being pulled through the water, and causes the lure to tilt to one side, as shown in FIG. 9. This positional tilt simulates a dying shad which has been found to be very attractive to game fish. When the lure is then pulled, the lure straightens and has a natural motion. The tilt can be increased or decreased based upon the mass of the hook, additional weight (not shown) and the location of the weight. A weed guard 220, preferably including two stiff wire members 222, 224 located one on either side of the hook 214, is provided outwardly from the hook and permits the lure to be fished in vegetation without becoming tangled in the vegetation.

There have been described and illustrated herein several embodiments of an articulating fishing lure. While particular embodiments of the invention have been described, it is not intended that the invention be limited thereto, as it is intended that the invention be as broad in scope as the art will allow and that the specification be read likewise. Thus, it will be appreciated that the lure can be provided with both a bill and a side mounted hook. In addition, single hooks may be replaced with multiple hooks, and multiple hooks may have fewer or greater number of barbed portions, or be a single hook. Also, while one type of weed guard is shown, other weed guards can be used as well. Furthermore, hooks may be provided in other or additional locations. Particularly, in the fixed hook third embodiment, the hook may be provided on either of, but preferably not both of, the sides of the head. Also, while a preferred number of sections is described which provides the lure with the most natural movement, it will be appreciated that fewer or more body sections may be provided, and/or the tail section may be integrated with a body section. Moreover, while it is preferred that the lure be snap fit together, it will be appreciated that it may be otherwise assembled. For example, the tail section can be assembled or molded as a single piece, then positioned with its hinge portion in the 'cavity' portion of one half of the third body section, and in the other half of the third body section can then be coupled thereon to trap the hinge portion. The third section can then be coupled to the second body section in the same manner, etc. It will therefore be appreciated by those skilled in the art that yet other modifications could be made to the provided invention without deviating from its spirit and scope as claimed.

What is claimed is:

1. A fishing lure, comprising:
   a) a substantially rigid head section having a longitudinal axis and having a rounded rear facing surface defining an apex lying substantially along said longitudinal axis;
   b) a substantially rigid tail section; and
   c) a plurality of substantially rigid body sections linearly arranged between said head section and said tail section, each of said body sections having a respective longitudinal axis, a convexly rounded rear facing surface defining an apex lying substantially along said respective longitudinal axis, and a substantially flat front facing surface defining a maximum width of a respective body section,
      wherein each of said tail section, said body sections, and said head section are coupled to adjacent sections in an articulating manner.

2. A fishing lure, comprising:

a) a head section having a head hinge cavity defining top, bottom, and side walls;
b) a tail section provided with a substantially rigid tail hinge portion; and
c) a plurality of body sections linearly arranged between said head section and said tail section, each of said body sections provided with a respective hinge cavity defining respective top, bottom, and side walls and a respective substantially rigid hinge portion,
   wherein said tail hinge portion and said respective hinge portions of said plurality of body sections are each in an articulating snap fit engagement with a respective hinge cavity on an adjacent one of said plurality of body sections or said head section, said snap fit engagements are each formed by interference between one of said hinge portions and a rear boundary of a respective one of said hinge cavities, said interference preventing removal of said one of said hinge portions from said respective one of said hinge cavities, said snap fit engagement substantially constraining said fishing lure to lateral articulation relative to left and right sides of said head section at each said snap fit engagement when said lure is pulled through water.

3. A fishing lure according to claim 2, wherein;
each of said tail hinge portion and said respective hinge portions of said body sections is bifurcated.

4. A fishing lure according to claim 2, wherein:
said hinge portion of said body section coupled to said head section includes a spindle portion having a length, and said head cavity includes an entrance into said hinge cavity, said entrance having a largest dimension, wherein said length is greater than said largest dimension.

5. A fishing lure according to claim 4, wherein:
said body section coupled to said head section is made of a substantially rigid plastic which is sufficiently resilient to permit said hinge portion thereof to bend to fit into said entrance.

6. A fishing lure according to claim 2, wherein:
each of said body sections has a discrete size.

7. A fishing lure according to claim 2, wherein:
said head section includes a diving bill.

8. A fishing lure according to claim 2, wherein:
each of said head section and said body sections includes a respective air chamber.

9. A fishing lure according to claim 8, wherein:
said air chamber in each of said body-sections has a longest length which is oriented in a substantially vertical direction.

10. A fishing lure according to claim 8, wherein:
said air chamber in said head section is located toward a top of said head.

11. A fishing lure according to claim 2, wherein:
said plurality of body sections includes exactly three sections each of a different size.

12. A fishing lure according to claim 2, wherein:
said head section is a fish head section and said tail section is a fish tail section, and
said articulation is lateral pivoting.

13. A fishing lure according to claim 2, further comprising:
d) a hook coupled to said fishing lure.

14. A fishing lure according to claim 2, wherein:
wherein said plurality of body sections include first, second, and third body sections, and said first body section is adapted to articulate relative to said head section by a first maximum degree,
said second body section is adapted to articulate relative to said first body section by a second maximum degree,
said third body section is adapted to articulate relative to said second body section by a third maximum degree, and
said tail section is adapted to articulate relative to said third body section by a fourth maximum degree,
wherein said third maximum degree is smaller than said first, second and fourth maximum degrees.

15. A fishing lure according to claim 14, wherein:
said first, second, third, and fourth maximum are different from each other.

16. A fishing lure according to claim 14, wherein:
said first maximum degree is substantially approximately 40°, said second maximum degree is substantially approximately 37°, said third maximum degree is substantially approximately 26°, and said fourth maximum degree is substantially approximately 35°.

17. A fishing lure according to claim 2, wherein:
each of said head section and said body sections are formed from two parts which are assembled together such that an air chamber is provided in said head section and at least one of said body sections.

18. A fishing lure according to claim 17, wherein:
each of said two parts are substantially mirror images of the other.

19. A fishing lure according to claim 17, wherein:
said tail section is formed from two halves which are assembled together.

20. A fishing lure according to claim 17, wherein:
said parts are assembled with glue.

21. A fishing lure according to claim 20, wherein:
each said hinge cavity of said head section and said plurality of body sections includes a recess adapted to trap glue from the assembly away from said engaged hinge portion.

22. A fishing lure according to claim 2, wherein:
said head section has a head length and said body sections together define a body length which is not greater than said head length.

23. A fishing lure according to claim 22, wherein:
said head section defines a head volume, and said body sections together define a body volume,
wherein said body volume is not greater than said head volume.

24. A fishing lure according to claim 2, further comprising:
a hook having a shank and a barb,
   said head section having first and second sides and defining a recess on said first side, said shank of said hook extending at least partially within said recess, and said hook being substantially immovably coupled to said head section such that said shank is located along said first side of said head section.

25. A fishing lure according to claim 24, wherein:
said hook is configured on said head section such that, in water and at rest, said head section tilts toward said first side.

26. A fishing lure according to claim 24, further comprising:
e) a weed guard coupled adjacent, but outward from, said barb of said hook.

27. A fishing lure according to claim 24, wherein:
said hook includes a single barb only.

28. A fishing lure having a longitudinal axis, comprising:
a) a head section having a hinge cavity;
b) a tail section provided with a hinge portion defining a spindle having an effective height and extending transverse to the longitudinal axis; and
c) a plurality of body sections linearly arranged between said head section and said tail section, each of said body sections provided with a hinge cavity and a hinge portion defining a spindle having an effective height and extending transverse to the longitudinal axis, each said hinge cavity of said head section and said plurality of body sections being enclosed on a top side, a bottom side, and two lateral sides such that each said hinge cavity is accessed only by a respective rear entrance, wherein said hinge portion of said tail section and said hinge portions of said plurality of body sections are coupled within said hinge cavity on an adjacent one of said plurality of body sections and said head section such that said fishing lure is adapted to articulate, said articulation being substantially limited to lateral pivoting about said hinge portions, wherein said rear entrance of a respective hinge cavity is smaller than said effective height of said spindle of a respective hinge portion coupled within the respective hinge cavity.

29. A fishing lure according to claim 28, wherein:
at least one of said head section and said body sections includes lateral notches at its respective rear entrance, said lateral notches being substantially aligned with a bottom of said hinge portion coupled thereto.

30. A fishing lure according to claim 28, wherein:
each of said body sections includes a relatively flat front portion and a rounded rear portion.

31. A fishing lure according to claim 28, wherein:
each said spindle is bifurcated.

* * * * *